US012241781B2

(12) United States Patent
Hirano et al.

(10) Patent No.: US 12,241,781 B2
(45) Date of Patent: Mar. 4, 2025

(54) DEVICE AND METHOD FOR MEASURING OPTICAL CONSTANT

(71) Applicant: THE UNIVERSITY OF TOKYO, Tokyo (JP)

(72) Inventors: Daisuke Hirano, Tokyo (JP); Makoto Gonokami, Tokyo (JP); Kosuke Yoshioka, Tokyo (JP)

(73) Assignee: THE UNIVERSITY OF TOKYO, Tokyo (JP)

( * ) Notice: Subject to any disclaimer, the term of this patent is extended or adjusted under 35 U.S.C. 154(b) by 280 days.

(21) Appl. No.: 17/672,114

(22) Filed: Feb. 15, 2022

(65) Prior Publication Data
US 2022/0252453 A1 Aug. 11, 2022

Related U.S. Application Data

(63) Continuation of application No. PCT/JP2020/030878, filed on Aug. 14, 2020.
(Continued)

(51) Int. Cl.
*G01J 3/18* (2006.01)
*G01J 3/02* (2006.01)
(Continued)

(52) U.S. Cl.
CPC ............... *G01J 3/18* (2013.01); *G01J 3/0229* (2013.01); *G01J 3/10* (2013.01); *G01J 3/2823* (2013.01); *G01J 3/45* (2013.01)

(58) Field of Classification Search
CPC .... G01J 3/18; G01J 3/0229; G01J 3/10; G01J 3/2823; G01J 3/0264
See application file for complete search history.

(56) References Cited

U.S. PATENT DOCUMENTS

2017/0281102 A1 10/2017 Ken et al.

FOREIGN PATENT DOCUMENTS

| CN | 105115940 A | 12/2015 |
| CN | 108132230 A | 6/2018 |
| TW | 201600901 A | 1/2016 |

OTHER PUBLICATIONS

Nagaho, "Development of a method for time-resolved phase-sensitive detection of refractive indices using high-order harmonics", UTokyo Repository; Mar. 23, 2017 (Year: 2017).*

(Continued)

*Primary Examiner* — Uzma Alam
*Assistant Examiner* — Mohamed Doumbia
(74) *Attorney, Agent, or Firm* — CANTOR COLBURN LLP

(57) ABSTRACT

A coherent light source outputs coherent light including high-order harmonics obtained by irradiating short-pulse laser light to a nonlinear medium. A spectrometer includes a grating that diffracts the coherent light and an image sensor that measures an image of the diffracted light. In a first state, a first double slit having a pair of apertures spaced apart in a first direction is arranged at a predetermined position between coherent light source and an incident slit of spectrometer. In a second state, a second double slit that is a replica of first double slit is arranged at the predetermined position as a replacement of first double slit with a sample held in one aperture. A calculation processing device calculates optical constants of the sample based on interference images measured in the first and second states.

11 Claims, 9 Drawing Sheets

Related U.S. Application Data

(60) Provisional application No. 62/887,077, filed on Aug. 15, 2019.

(51) Int. Cl.
  G01J 3/10    (2006.01)
  G01J 3/28    (2006.01)
  G01J 3/45    (2006.01)

(56) References Cited

OTHER PUBLICATIONS

Chang et al., "Direct measurement of index of refraction in the extreme-ultraviolet wavelength region with a novel interferometer", Optics Letters; vol. 27, No. 12; USA; Jun. 15, 2002; pp. 1028-1030 (Year: 2002).*
Extended European Search Report for corresponding EP Application No. 20851707.8; Issued on Jun. 26, 2023.
Hirano et al., "Measurement of complex refractive index with tunable extreme ultraviolet high harmonic source"; Optics Express, vol. 28 No. 10; May 10, 2020; 13 pages.
Diao et al., "Carrier-envelope phase effects on the spatial coherence of high-order harmonics"; Optics Express, vol. 22, No. 15; Jul. 28, 2014; 9 pages.
Chao et al., "Demonstration of 12 nm Resolution Fresnel Zone Plate Lens based Soft X-ray Microscopy", Optical Express; vol. 17, No. 20, Sep. 28, 2009; 9 pages.
Chou et al., "Single-crystalline aluminum film for ultraviolet plasmonic nanolasers", Scientific Reports; Jan. 27, 2016; 6:19887; doi:10-1038/srep19887; pp. 1-9.
Popmintchev et al., "The attosecond nonlinear optics of bright coherent X-ray generation", Nature Photonics; vol. 4. Dec. 2010; pp. 822-832.
Thompson et al., Chapter 15—Van Cittert-Zernike Theorem, Spatial Coherence, and Scattering; Interferometry and Synthesis in Radio Astronomy and Astrophysics Library, 2017; pp. 767-786.
Dobaczewski et al., "Error Estimates of Theoretical Models: a Guide", arXiv:1402.4657v1 [nucl-th] Feb. 19, 2014; pp. 1-24.
Alexander et al., "Quantification of oxide film thickness at the surface of aluminium using XPS", Surface and Interface Analysis (SAI), 2002; 34: pp. 485-489.
Bajt et al., "Improved reflectance and stability of Mo—Si multilayers", Society of Photo-Optical Instrumentation Engineers; Opt. Eng. 41(8); Aug. 2002; pp. 1797-1804.
Bartels et al., "Generation of Spatially Coherent Light at Extreme Ultraviolet Wavelengths", Science; downloaded from www.sciencemag.org at University of Tokyo on May 24, 2022; vol. 297, Jul. 19, 2002; pp. 376-379.
Barysheva et al., "Precision imaging multilayer optics for soft X-rays and extreme ultraviolet bands", Physics-Uspekhi, Turpion; Instruments and Methods of Investigation, vol. 55; 2012; pp. 681-699.
Birken et al., "Angular Dependent Photoelectric Yield and Optical Constants of Al Between 40 and 600 eV", Nuclear Instruments and Methods in Physics Research A253 (1986), pp. 166-170.
Chang et al., "Direct measurement of index of refraction in the extreme-ultraviolet wavelength region with a novel interferometer", Optics Letters; vol. 27, No. 12; USA; Jun. 15, 2002; pp. 1028-1030.
Corkum, "Plasma Perspective on Strong-Field Multiphoton Ionization", Physical Review Letters; vol. 71, No. 13; Sep. 27, 1993; pp. 1994-1997.
Das et al., "Fine structures in refractive index of sapphire at the LII, III absorption edge of aluminum determined by soft x-ray resonant reflectivity"; Applied Optics; vol. 51, No. 30; Oct. 20, 2012; pp. 7402-7410.
Descamps et al., "Extreme ultraviolet interferometry measurements with high-order harmonics", Optics Letters; vol. 25, No. 2; Jan. 15, 2000; pp. 135-137.
Fraser et al., "The X-ray energy response of silicon Part A. Theory", Nuclear Instruments and Methods in Physics Research, Section A 350; May 24, 1994; pp. 368-378.
Frumker et al., "Frequency-resolved high-harmonic wavefront characterization", Optics Letters; vol. 34, No. 19; Oct. 1, 2009; pp. 3026-3028.
Gianola et al., "Stress-assisted discontinuous grain growth and its effect on the deformation behavior of nanocrystalline aluminum thin films", Elsverier; Acta Materialia 54; Jan. 18, 2006; pp. 2253-2263.
Goldberg et al., "Progress towards λ/20 extreme ultraviolet interferometry", Journal of Vacuum Science & Technology B, vol. 13 No. 6; Nov./Dec. 1995: pp. 2922-2927.
Goldstein et al., "Extreme-ultraviolet microexposure tool at 0.5 NA for sub-16 nm lithography", Optics Letters; vol. 33, No. 24, Dec. 15, 2008; pp. 2995-2997.
Gullikson et al., "Absolute photoabsorption measurements of Mg, Al, and Si in the soft-x-ray region below the L2,3 edges", Physical Review B, vol. 49, No. 23; Jun. 15, 1994; pp. 16-283 to 16-289.
Hemmers et al., "Direct measurement of the complex refractive index of thin foils in the XUV spectral range by point diffraction interferometry", Applied Physics B, Laser and Optics, (Jun. 16, 2012); pp. 167-175.
International Search Report for International Application No. PCT/JP2020/030878; Mailing date, Nov. 2, 2020.
Keenan et al., "Measurements of the XUV transmission of aluminium with a soft x-ray laser", Institute of Physics Publishing, Journal of Physics B: Atomic Molecular and Optical Physics 35 , Oct. 1, 2002; pp. L447-L451.
Lee et al., "Wave-front phase measurements of high-order harmonic beams by use of point-diffraction interferometry", Optics Letters; vol. 28, No. 6; Mar. 15, 2003; pp. 480-482.
Li et al., "Thermal and structural deformation and its impact on optical performance of projection optics for extreme ultraviolet lithography", Journal of Vacuum Science & Technology B: Microelectronics and Nanometer Structures Processing, Measurement, and Phenomena 21, Dec. 30, 2002; pp. 126-129.
Lloyd et al., "Complete spatial characterization of an optical wavefront using a variable-separation pinhole pair", Optics Letters; vol. 38, No. 7; Apr. 1, 2013; pp. 1173-1175.
Macklin et al., "High-Order Harmonic Generation Using Intense Femtosecond Pulses", Physical Review Letters; vol. 70, No. 6; Feb. 8, 1993; pp. 766-769.
Mercere et al., "Hartmann wave-front measurement at 13.4 nm with a EUV/120 accuracy", Optics Letters; vol. 28, No. 17; Sep. 1, 2003; pp. 1534-1536.
Nakakubo, "Development of a method for time-resolved phase-sensitive detection of refractive indices using high-order harmonics", UTokyo Repository; Mar. 23, 2017; 60 pages (with English abstract).
Henke, et al., "X-Ray Interactions: Photoabsorption, Scattering, Transmission, and Reflection At E=50-30,000 eV, Z=1-92"; Atomic Data and Nuclear Data Tables; vol. 54, No. 2, Jul. 1993; pp. 181-342.
Paul et al., "Observation of a Train of Attosecond Pulses from High Harmonic Generation", Science; downloaded from sciencemag.org at University of Tokyo on May 24, 2022; vol. 292; Jun. 1, 2001; pp. 1689-1693.
PCT International Preliminary Report on Patentability with Written Opinion of the International Search Authority for International Application No. PCT/JP2020/030878; Date of Mailing, Feb. 8, 2022.
Ray-Chaudhuri et al., "Impact of thermal and structural effects on EUV lithographic performance", Proceedings of SPIE vol. 3331; Emerging Lithographic Technologies II; Jun. 5, 1998; pp. 123-132.
Sinervo, "Definition and Treatment of Systematic Uncertainties in High Energy Physics and Astrophysics", PHYSTAT2003, SLAC, Sep. 8-11, 2003; pp. 122-129.
Stearns et al., "Multilayer mirror technology for soft-x-ray projection lithography", Applied Optics; vol. 32, No. 34; Dec. 1, 1993; pp. 6952-6960.
Takeda et al., "Fourier-transform method of fringe-pattern analysis for computer-based topography and interferometry", J. Optical Society of America; vol. 72, No. 1; Jan. 1982; pp. 156-160.

(56) References Cited

OTHER PUBLICATIONS

Wilson et al., "Double slit interferometry to measure the EUV refractive indices of solids using high harmonics", Applied Optics; vol. 51, No. 12; Apr. 18-20, 2012; pp. 2057-2061.
Windt, "EUV multilayer coatings for solar imaging and spectroscopy", Proceedings of SPIE vol. 9604, Solar Physics and Space Weather Instrumentation VI; Sep. 21, 2015; pp. 96040P-1 to 96040P-12.
Yan et al., "Accurate and Facile Determination of the Index of Refraction of Organic Thin Films Near the Carbon 1s Absorption Edge", Physical Review Letters; PRL 110, 177401; Apr. 26, 2013; pp. 177401-1 to 177401-5.
TIPO First Office Action; Taiwan Patent Application No. 109127790; mailed Oct. 31, 2023; 17 pages.
JPO Notification of Reason(s) for Refusal for corresponding JP Application No. 2021-539316; Issued Aug. 27, 2024.

\* cited by examiner

300

302

DEVICE AND METHOD FOR MEASURING OPTICAL CONSTANT

CROSS REFERENCE TO RELATED APPLICATIONS

This application is a continuation under 35 U.S.C. § 120 of PCT/JP2020/030878, filed Aug. 14, 2020, which claims priority to U.S. Provisional Application No. 62/887,077, filed Aug. 15, 2019, both of which are incorporated by reference in their entirety herein.

1. TECHNICAL FIELD

The present invention relates to a measurement technique for an optical constant such as a complex refractive index.

2. DESCRIPTION OF THE RELATED ART

In order to advance the application of optical techniques in the EUV region such as EUV lithography, advanced optical parameter control such as phase control is required. This requires advanced optical elements such as a multilayer mirror, mask, or the like (Non-patent documents 2 and 3). However, optical constants in the EUV region are not sufficiently known. Accordingly, it is necessary to create a database of such optical constants in the EUV region.

Several methods have been proposed for the measurement of the refractive index in the EUV region. The most well-known method is that obtained in the work of Henke et al. With this method, the real part of the refractive index is acquired using Kramers-Kronig transformation of the absorption spectrum. However, it has been suggested that this method has a problem of poor precision of the acquired measurement values (Non-patent documents 5, 28, and 29).

A new measurement method using double-slit interference has been proposed. With this method, the relative intensities of the two optical paths and the phase difference that occurs due to the optical path difference are acquired based on a double-slit interference image obtained using coherent light. This allows a complex refractive index to be directly acquired.

In a case of employing incoherent synchrotron radiation as a light source, this involves drastic reduction of the photon flux density after a coherent component is extracted. This requires an optical system for making maximum use of the reduced photon flux density. However, such an optical system requires an arrangement to be changed according to the wavelength. In many cases, such an arrangement has the potential to cause the occurrence of systematic uncertainty due to mechanical positioning in the dispersion measurement (Non-patent document 8).

RELATED ART DOCUMENTS (NON-PATENT DOCUMENTS)

Non-patent document 1: W. Chao, J. Kim, S. Rekawa, P. Fischer, and E. H. Anderson, Opt. Exp., 17, 17669 (2009).
Non-patent document 2: M. Goldstein, R. Hudyma, P. Naulleau, and S. Wurm, Opt. Lett., 33, 2995 (2008).
Non-patent document 3: S. Bajt, J. B. Alameda, T. W. Barbee, W. M. Clift, J. A. Folta, B. B. Kaufmann, and E. A. Spiller, Opt. Eng., 41, 1797 (2002).
Non-patent document 4: D. G. Stearns, R. S. Rosen, and S. P. Vernon, Appl. Opt., 32, 6952 (1993).
Non-patent document 5: A. K. Ray-Chaudhuri, S. E. Gianoulakis, P. A. Spence, M. P. Kanouff, and C. D. Moen, in Emerging Lithographic Technologies II (International Society for Optics and Photonics, 1998), pp. 124-133.
Non-patent document 6: B. L. Henke, E. M. Gullikson, and J. C. Davis, Atomic Data and Nuclear Data Tables 54, 181 (1993).
Non-patent document 7: H.-G. Birken, W. Jark, C. Kunz, and R. Wolf, Nuclear Instruments and Methods in Physics Research Section A: Accelerators, Spectrometers, Detectors and Associated Equipment 253, 166 (1986).
Non-patent document 8: C. Chang, E. Anderson, P. Naulleau, E. Gullikson, K. Goldberg, and D. Attwood, Opt. Lett. 27, 1028 (2002).
Non-patent document 9: E. M. Gullikson, P. Denham, S. Mrowka, and J. H. Underwood, Phys. Rev. B 49, 16283 (1994).
Non-patent document 10: D. S. Gianola, S. Van Petegem, M. Legros, S. Brandstetter, H. Van Swygenhoven, and K. J. Hemker, Acta Materialia 54, 2253 (2006).
Non-patent document 11: B.-T. Chou, Y-H. Chou, Y-M. Wu, Y.-C. Chung, W.-J. Hsueh, S.-W. Lin, T.-C. Lu, T.-R. Lin, and S.-D. Lin, Scientific Reports 6, 19887 (2016).
Non-patent document 12: P. B. Corkum, Phys. Rev. Lett. 71, 1994 (1993). Non-patent document 13: P. M. Paul, E. S. Toma, P. Breger, G. Mullot, F. Auge, P. Balcou, H. G. Muller, and P. Agostini, Science 292, 1689 (2001).
Non-patent document 14: R. A. Bartels, A. Paul, H. Green, H. C. Kapteyn, M. M. Murnane, S. Backus, I. P. Christov, Y. Liu, D. Attwood, and C. Jacobsen, Science 297, 376 (2002).
Non-patent document 15: J. J. Macklin, J. D. Kmetec, and C. L. Gordon, Phys. Rev. Lett. 70, 766 (1993).
Non-patent document 16: T. Popmintchev, M.-C. Chen, P. Arpin, M. M. Murnane, and H. C. Kapteyn, Nature Photonics 4, 822 (2010).
Non-patent document 17: M. R. Alexander, G. E. Thompson, X. Zhou, G. Beamson, and N. Fairley, Surf. Interface Anal. 34, 485 (2002).
Non-patent document 18: A. Das, R. K. Gupta, M. H. Modi, C. Mukherjee, S. K. Rai, A. Bose, T. Ganguli, S. C. Joshi, G. S. Lodha, and S. K. Deb, Applied Optics 51, 7402 (2012).
Non-patent document 19: R. Keenan, C. L. S. Lewis, J. S. Wark, and E. Wolfrum, J. Phys. B: At. Mol. Opt. Phys. 35, L447 (2002).
Non-patent document 20: M. M. Barysheva, A. E. Pestov, N. N. Salashchenko, M. N. Toropov, and N. I. Chkhalo, Phys.-Usp. 55, 681 (2012).
Non-patent document 21: Y. Li, K. Ota, and K. Murakami, Journal of Vacuum Science & Technology B: Microelectronics and Nanometer Structures Processing, Measurement, and Phenomena 21, 127 (2002).
Non-patent document 22: D. Descamps, C. Lynga, J. Norin, A. L'Huillier, C.-G. Wahlstrom, J.-F. Hergott, H. Merdji, P. Salieres, M. Bellini, and T. W. Hansch, Opt. Lett., 25, 135 (2000). Non-patent document 23: D. Hemmers, M. Benzid, and G. Pretzler, Appl. Phys. B 108, 167 (2012).
Non-patent document 24: L. A. Wilson, A. K. Rossall, E. Wagenaars, C. M. Cacho, E. Springate, I. C. E. Turcu, and G. J. Tallents, Appl. Opt. 51, 2057 (2012).
Non-patent document 25: K. A. Goldberg, R. Beguiristain, J. Bokor, H. Medecki, D. T. Attwood, K. Jackson, E. Tejnil, and G. E. Sommargren, Journal of Vacuum Science & Technology B: Microelectronics and Nanometer Structures Processing, Measurement, and Phenomena 13, 2923 (1995).

Non-patent document 26: D. G. Lee, J. J. Park, J. H. Sung, and C. H. Nam, Opt. Lett., 28, 480 (2003).

Non-patent document 27: P. Mercere, P. Zeitoun, M. Idir, S. L. Pape, D. Douillet, X. Levecq, G. Dovillaire, S. Bucourt, K. A. Goldberg, P. P. Naulleau, and S. Rekawa, Opt. Lett., 28, 1534 (2003).

Non-patent document 28: H. Yan, C. Wang, A. R. McCarn, and H. Ade, Phys. Rev. Lett. 110, 177401 (2013)

Non-patent document 29: D. L. Windt, in Solar Physics and Space Weather Instrumentation VI (International Society for Optics and Photonics, 2015), p. 96040P.

Non-patent document 30: G. W. Fraser, A. F. Abbey, A. Holland, K. McCarthy, A. Owens, and A. Wells, Nuclear Instruments and Methods in Physics Research Section A: Accelerators, Spectrometers, Detectors and Associated Equipment 350, 368 (1994).

Non-patent document 31: M. Takeda, H. Ina, and S. Kobayashi, "Fourier-transform method of fringe-pattern analysis for computer-based topography and interferometry," J. Opt. Soc. Am., 72(1), 156-160 (1982).

Non-patent document 32: A. R. Thompson, J. M. Moran, and G. W. Swenson, "Van Cittert-Zernike Theorem, Spatial Coherence, and Scattering," in Interferometry and Synthesis in Radio Astronomy, A. R. Thompson, J. M. Moran, and G. W. Swenson Jr., eds. (Springer International Publishing, 2017), pp. 767-786.

Non-patent document 33: E. Frumker, G. G. Paulus, H. Niikura, D. M. Villene, and P. B. Corkum, "Frequency-resolved high-harmonic wavefront characterization," Opt. Lett. 34(19), 3026-3028 (2009).

Non-patent document 34: D. T. Lloyd, K. O'Keeffe, and S. M. Hooker, "Complete spatial characterization of an optical wavefront using a variable-separation pinhole pair," Opt. Lett. 38(7), 1173-1175 (2013).

Non-patent document 35: J. Dobaczewski, W. Nazarewicz, and P.-G. Reinhard, "Error estimates of theoretical models: a guide," J. Phys. G Nucl. Part. Phys. 41(7), 074001 (2014).

Non-patent document 36: P. Sinervo, "Definition and Treatment of Systematic Uncertainties in High Energy Physics and Astrophysics," (2003).

With an interference measurement using high-order harmonics, which are a source of coherent light, this enables interference measurement without a problem that occurs in the method employing an incoherent light source described above. This light source has high coherence and a wide bandwidth. Accordingly, it can be said that this light source is an ideal light source for refractive index measurement and dispersion measurement in refractive index measurement.

Measurements using such harmonics have been reported. Such measurements remain at the proof-of-principle stage and provide very poor measurement precision on the order of 1 rad. Furthermore, such harmonics have an intensity with odd-order peaks with respect to the fundamental wave. This restricts the wavelengths for measurement. However, in practical use, the light source is required to support any desired wavelength.

In order to design optical elements to be used in the EUV region, high-precision measurement is required for a complex refractive index at a desired wavelength.

SUMMARY

The present disclosure has been made in view of such a situation. Accordingly, it is an exemplary purpose of the present disclosure to provide improved precision of the measurement of optical constants.

An optical constant measurement apparatus according to an embodiment of the present disclosure includes: a coherent light source, a spectrometer, a first double slit, a second double slit, and a calculation processing device. The coherent light source is structured to output coherent light including high-order harmonics obtained by irradiating short-pulse laser light to a nonlinear medium. The spectrometer includes a grating structured to diffract the coherent light and an image sensor structured to acquire an image of light diffracted by the grating. The first double slit has a pair of apertures arranged with an interval in a first direction. The first double slit is arranged at a predetermined position between the coherent light source and an incident slit of the spectrometer in a first state. The second double slit has a pair of apertures that are a replica of the first double slit. The second double slit is arranged at the predetermined position as a replacement of the first double slit in a state in which one from among the pair of apertures holds a sample in a second state. The calculation processing device is structured to calculate optical constants of the sample based on a first interference image formed on the image sensor due to the harmonics of the coherent light in the first state and a second interference image formed on the image sensor due to the harmonics in the second state.

It is to be noted that any arbitrary combination or rearrangement of the above-described structural components and so forth is effective as and encompassed by the present embodiments. Moreover, all of the features described in this summary are not necessarily required by embodiments so that the embodiment may also be a sub-combination of these described features. In addition, embodiments may have other features not described above.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Outline of Embodiments

Figure 1:
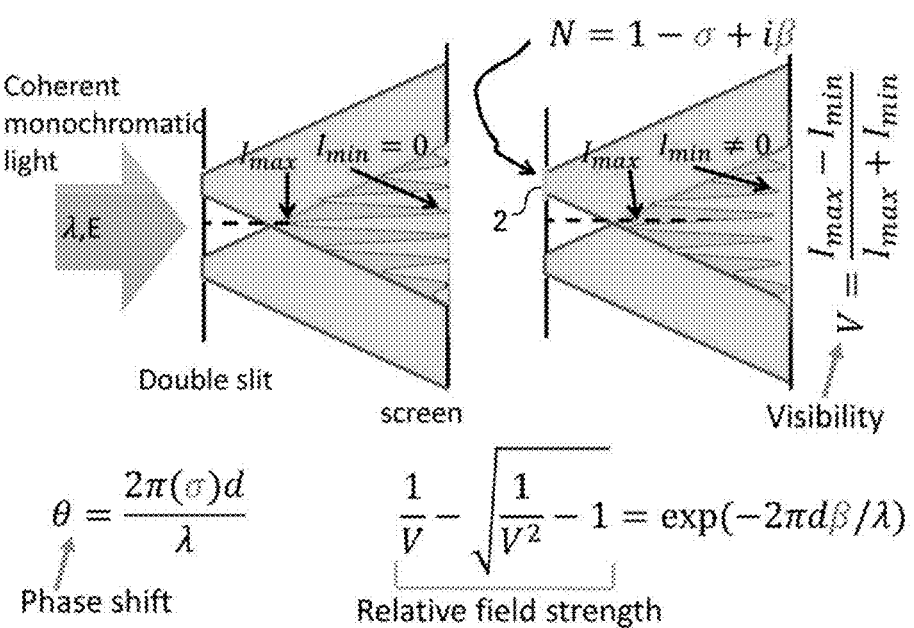
FIG. 1 is a diagram for explaining the principle of refractive index measurement by means of a double slit.

Description will be made regarding an outline of several example embodiments of the present disclosure. In this outline, some concepts of one or more embodiments will be described in a simplified form as a prelude to the more detailed description that is presented later in order to provide a basic understanding of such embodiments. Accordingly, the outline is by no means intended to restrict the scope of the present invention or the present disclosure. Furthermore, this outline is not an extensive overview of all conceivable embodiments and is by no means intended to restrict essential elements of the embodiments. In some cases, for convenience, the term "one embodiment" may be used herein to refer to a single embodiment (example or modification) or multiple embodiments (examples or modifications) disclosed in the present specification.

An optical constant measurement apparatus according to an embodiment includes: a coherent light source configured to output coherent light including high-order harmonics obtained by irradiating short-pulse laser light to a nonlinear medium; a spectrometer including a grating configured to diffract the coherent light and an image sensor configured to acquire an image of light diffracted by the grating; a first double slit having a pair of apertures arranged with an interval in a first direction, which are arranged at a predetermined position between the coherent light source and an incident slit of the spectrometer in a first state; a second double slit having a pair of apertures that are a replica of the first double slit, which are arranged at the predetermined position as a replacement of the first double slit in a state in which one from among the pair of apertures holds a sample in a second state; and a calculation processing device configured to calculate optical constants of the sample based on a first interference image formed on the image sensor due to the harmonics of the coherent light in the first state and a second interference image formed on the image sensor due to the harmonics in the second state.

In the first state, an interference image is measured using the double slit without a sample. In the second state, an interference image is measured using the double slit with a sample. With such an arrangement using the two interference images, this allows an optical constant of the sample to be acquired in a quantitative manner.

It should be noted that, in the present disclosure, typically, the "optical constant" is the refractive index. More specifically, the "optical constant" is the complex refractive index. However, the "optical constant" is not restricted to the refractive index. Also, examples of the "optical constant" include: a thickness of a material having a known refractive index; a transmittance of a non-transparent material; etc.

As an embodiment, the optical constant measurement apparatus may be modeled using parameters. The interference image of the double slit can be modeled based on a model of the optical constant measurement apparatus. With such an arrangement, the parameters of the model are optimized such that the model of the interference image matches the measured interference image. This allows the optical constant of the sample and the parameters including the error of the optical measurement apparatus to be acquired in a quantitative manner.

Also, the calculation processing device may calculate an intensity distribution formed on the image sensor for each of the first state and the second state using a one-dimensional Fresnel diffraction expression based on the model of the optical constant measurement apparatus. Also, the parameters of the model and the optical constants of the sample may be acquired such that the intensity distributions thus calculated approach the first interference image and the second interference image.

With such an arrangement in which the high-order harmonic interference image of the double slit is modeled, this allows the optical constant to be quantitatively estimated as a parameter of the model function. Also, the statistical uncertainty of the measurement value may be quantified by measurement so as to optimize the design of the double slit such that the uncertainty of the optical constant is minimized.

Also, the apertures of the first double slit and the second double slit may be modeled using an error function. This is capable of removing the high-frequency components that are equal to or higher than the Nyquist frequency as compared with an arrangement in which the aperture is modeled by a step function.

Also, the first interference image and the second interference image may each be acquired as an integrated interference image using multiple irradiations of the coherent light. Also, a function of a wavefront of an incident wave to each of the first double slit and the second double slit may be handled assuming that a center position thereof fluctuates in a normal distribution.

As an embodiment, the first double slit and the second double slit may be continuously formed in a second direction that is orthogonal to the first direction. Also, the optical constant measurement apparatus may include a stage configured to shift the first double slit and the second double slit in the second direction.

As an embodiment, the coherent light source may include an optical parametric amplifier. Also, the coherent light source may be configured to provide the short-pulse laser light with a variable wavelength. With this arrangement, by making a combination of the optimization of the wavelength of the fundamental wave and the orders of the high-order harmonics, this allows an interference image to be acquired at a desired wavelength in the EUV region.

As an embodiment, the coherent light source may include: a main light source configured to generate the short-pulse laser light; a gas nozzle configured to inject a gas that is the nonlinear medium; a focusing optical system configured to focus the short-pulse laser light onto the gas; and a stabilizing apparatus configured to monitor position of the short-pulse laser light at two points in the focusing optical system, wherein the short-pulse laser light is provided as parallel light in one of the two points, and another of the two points is a focusing point of the focusing optical system, so as to control a mechanical state of an optical element of the focusing optical system. This allows beam pointing to be stabilized, thereby allowing the uncertainty in the measurement system to be reduced.

An embodiment of the present disclosure relates to a refractive index measurement method. The refractive index measurement method includes: irradiating short-pulse laser light to a nonlinear medium so as to generate coherent light including high-order harmonics; irradiating the coherent light such that it passes through a first double slit having a pair of apertures arranged with an interval in a first direction, so as to measure a first interference image; irradiating the coherent light such that it passes through a second double slit having a pair of apertures that are a replica of the first double slit in a state in which one from among the pair of apertures holds a sample; and calculating an optical constant of the sample based on the first interference image and the second interference image.

An embodiment of the present disclosure relates to a method for calculating an optical constant. This method is a method for calculating an optical constant of a sample based on a first interference image and a second interference image obtained by a measurement system. The measurement system includes: a coherent light source configured to output coherent light including high-order harmonics obtained by irradiating short-pulse laser light to a nonlinear medium; a spectrometer including a grating configured to diffract the coherent light and an image sensor configured to acquire an image of light diffracted by the grating; a first double slit having a pair of apertures arranged with an interval in a first direction, which are arranged at a predetermined position between the coherent light source and an incident slit of the spectrometer in a first state; and a second double slit having a pair of apertures that are a replica of the first double slit, which are arranged at the predetermined position as a replacement of the first double slit in a state in which one from among the pair of apertures holds a sample in a second state. In the first state, the first interference image is formed on the image sensor as an image of harmonics of the coherent light. In the second state, the second interference image is formed on the image sensor as an image of the harmonics. The calculation method includes: defining a model of the measurement system for each of the first state and the second state; calculating a first diffraction pattern generated by a model of the measurement system in the first state based on a one-dimensional Fresnel diffraction expression; calculating a second diffraction pattern generated by a model of the measurement system in the second state based on a one-dimensional Fresnel diffraction expression; and calculating a parameter of the model of the measurement system and the optical constant of the sample such that the first diffraction pattern approaches the first interference image and the second diffraction pattern approaches the second interference image.

Embodiments

Description will be made below regarding the present invention based on preferred embodiments with reference to the drawings. The same or similar components, members, and processes are denoted by the same reference numerals, and redundant description thereof will be omitted as appropriate. The embodiments have been described for exemplary purposes only and are by no means intended to restrict the present invention. Also, it is not necessarily essential for the present invention that all the features or a combination thereof be provided as described in the embodiments.

Principle of Complex Refractive Index Measurement

FIG. 1 is a diagram for explaining the principle of complex refractive index measurement using the double-slit method. The shape of a double-slit interference image is analyzed so as to estimate the optical path difference and the intensity ratio between electric fields that have passed through two slits (a double slit) (Non-patent document 8). In a case in which a sample (sample 2) is placed in one slit, the optical path difference and the intensity ratio between the electric fields are determined by the refractive index and the thickness of the sample. Thus, the complex refractive index of the sample can be directly acquired by the following Expression (1) based on the two parameters thus estimated, i.e., the phase shift θ and the electric field intensity ratio thus estimated.

[Expression 1]

$$\theta = 2\pi\sigma d/\lambda, L = \exp(-2\pi d\beta/\lambda) \quad (1)$$

Here, d represents the thickness of the sample 2, and λ represents the wavelength. The refractive index is represented by $N=1-\sigma+i\beta$.

It should be noted that such a method in which the phase θ and the electric field intensity ratio L are estimated so as to calculate the complex refractive index is insufficient from the viewpoint of precision. That is to say, there is room for further improving this method. In order to solve such a problem, in the present embodiment, the complex refractive index is calculated based on another analysis method as described later.

Measurement Apparatus

Figure 2:
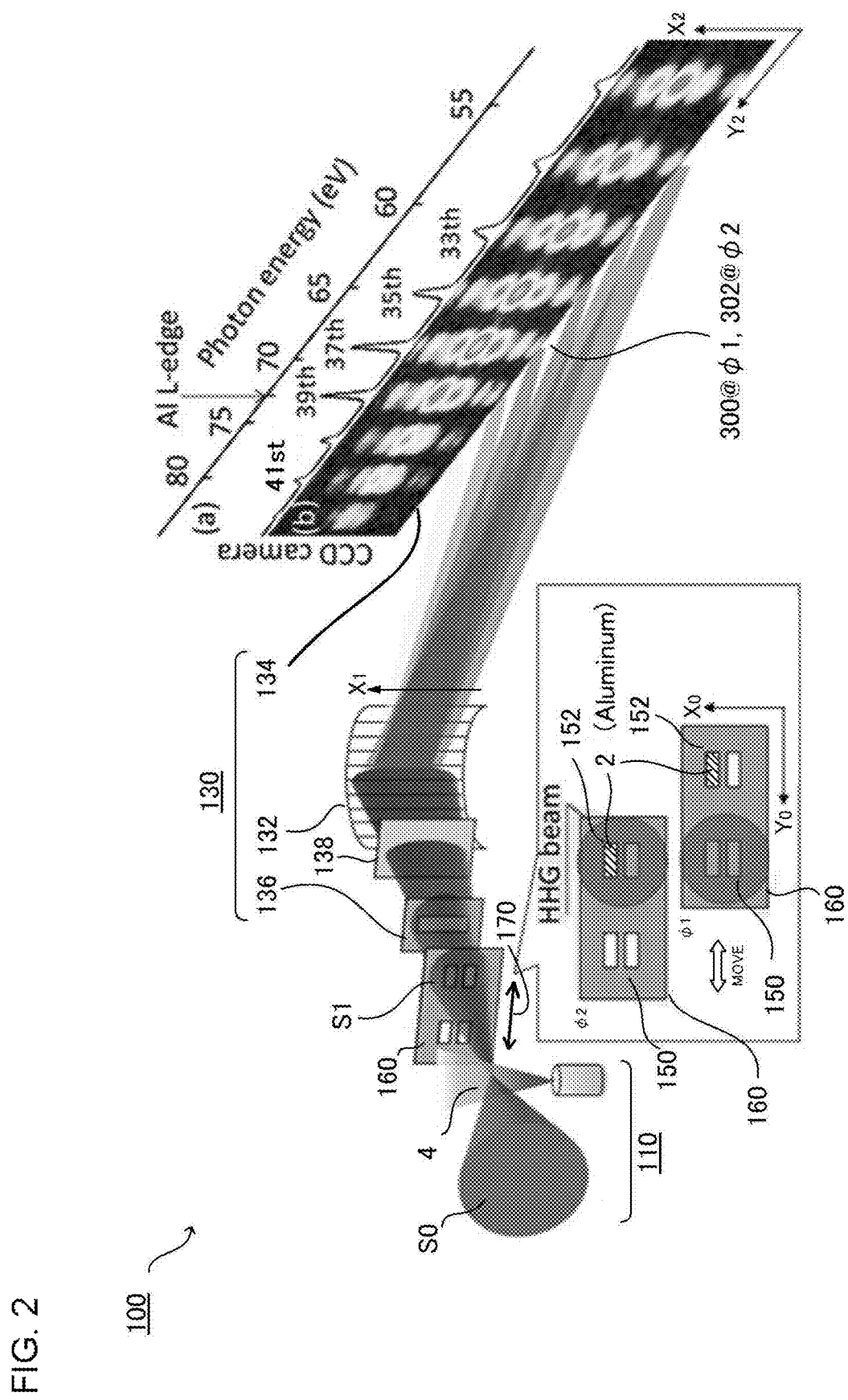
FIG. 2 is a diagram showing an optical constant measurement apparatus according to an embodiment.

FIG. 2 is a diagram showing an optical constant measurement apparatus 100 according to an embodiment. The optical constant measurement apparatus 100 provides measurements in two states, i.e., a first state φ1 and a second state φ2. The optical constant measurement apparatus 100 mainly includes a coherent light source 110, a spectrometer 130, a first double slit 150, a second double slit 152, and a calculation processing device 200.

In order to support an interference experiment, such an arrangement requires a light source with high coherence. In the present embodiment, the light source is configured as a laser-based high-order harmonic light source, thereby providing a light source with high spatial coherence. The coherent light source 110 irradiates short-pulse laser light S0 to a nonlinear medium so as to generate and output coherent light S1 including high-order harmonics. As the nonlinear medium 4, a suitable element that provides high-order harmonics with high luminance at a wavelength to be used for the measurement of the complex refractive index may preferably be selected. For example, as the nonlinear medium 4, an element may be selected from among rare-gas elements (He, Ne, Ar, Kr, Xe).

Figure 3:
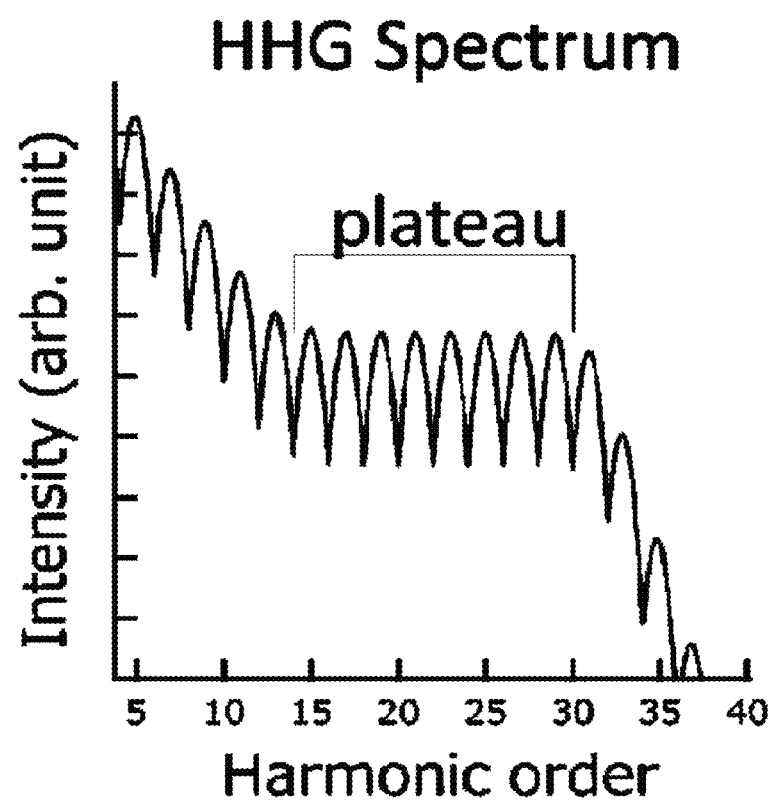
FIG. 3 is a diagram showing a spectrum in high-order harmonic generation.

FIG. 3 is a diagram showing a spectrum generated in high-order harmonic generation (HHG). The high-order harmonics have peaks at energy values obtained by multiplying the energy of the fundamental wave by an odd number and has a region in which the peaks have uniform intensities regardless of the order over a wide bandwidth (which is referred to as a "plateau region"). In order to perform a measurement taking advantage of such a wide bandwidth, interference light is diffracted by a grating, and the diffracted light is focused on an image sensor (e.g., a two-dimensional CCD camera), so as to perform spectroscopic measurement of the interference image. The fundamental wave has a variable wavelength. This enables refractive index measurement at a desired wavelength in the EUV region.

Returning to FIG. 2, the spectrometer 130 includes a grating 132, an image sensor 134, an incident slit 136, a filter 138, and so forth. The grating 132 diffracts the coherent light S1. The image sensor 134 captures an image of the light diffracted by the grating 132. The filter 138 removes the fundamental wave component from the light that has passed through the incident slit 136 and passes through the harmonic components. As the filter 138, an aluminum thin film (aluminum filter) or the like may be employed.

The first double slit 150 has a pair of slits (aperture pair) arranged with an interval in a first direction (vertical direction X in the drawing). In the first state φ1, the first double slit 150 is positioned at a predetermined position between the coherent light source 110 and the incident slit 136 of the spectrometer 130.

In the first state φ1, the first double slit 150 acts on the harmonics of the coherent light S1, thereby forming a first interference image 300 on the image sensor 134. The interference image is formed for each order of the harmonics.

The second double slit 152 has an aperture pair that is a replica of the first double slit 150 such that they have the same shape and the same size. In the second state φ2, the second double slit 152 is positioned at a predetermined position as a replacement of the first double slit 150 and the second double slit 152 hold the sample 2 at one aperture of its aperture pair.

In the second state φ2, the second double slit 152 holding the sample 2 acts on the harmonics of the coherent light S1, thereby forming a second interference image 302 on the image sensor 134.

Preferably, the first double slit 150 and the second double slit 152 are continuously formed in the second direction Y that is orthogonal to the first direction in the form of a single unit, which will be referred to as a sample holder 160. With such an arrangement in which the first double slit 150 and the second double slit 152 are formed in the form of a single unit, this is capable of reducing aperture position deviation between the first state φ1 and the second state φ2. Preferably, such an arrangement enables positioning of the sample holder 160 in the second direction Y by means of a movable stage 170.

The calculation processing apparatus 200 calculates the complex refractive index of the sample 2 based on the first interference image 300 measured in the first state and the second interference image 302 measured in the second state.

The optical constant measurement apparatus 100 is represented by a model using parameters. The parameters may include variables (unknown values) and constants (known values). A parameter that is a large source of error may be defined as a variable. In contrast, a parameter that is a negligible source of error may be defined as a constant.

The calculation processing device 200 calculates the intensity distribution of the interference image formed on the image sensor 134 in the first state and the second state based on the model of the optical constant measurement apparatus 100 using the one-dimensional Fresnel diffraction expression.

Figure 4:
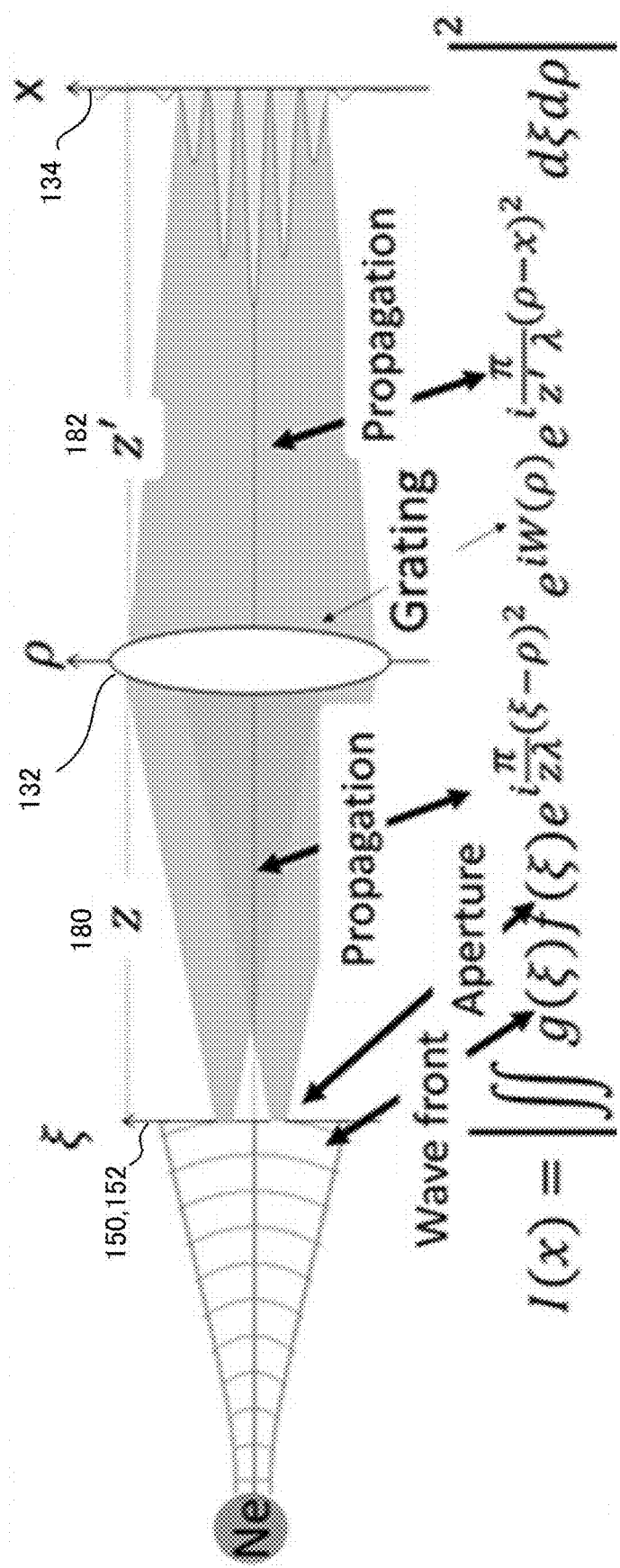
FIG. 4 is a diagram for explaining formation of an interference image based on a one-dimensional Fresnel diffraction model.

FIG. 4 is a diagram for explaining the formation of the interference image based on the one-dimensional Fresnel diffraction model. Here, I(x) represent the intensity distribution on the sensor surface of the image sensor 134 that functions as a screen. In this example, the optical constant measurement apparatus 100 is modeled with (i) the wavefront of the coherent light incident to the double slit, (ii) the double slits 150 and 152, (iii) a free space 180 between the double slits 150 and 152 and the grating 132, (iv) the grating 132, and (v) a free space 182 between the grating 132 and the image sensor 134 as the modeling components.

(i) The function $g(\xi)$ represents a model of the wavefront.

(ii) The function $f(\xi)$ represents a model of the aperture of the double slit.

(iv) The function $W(\rho)$ represents a model of the grating 132.

The free spaces 180 and 182 can be treated as typical propagation in a free space.

Here, $\xi$ is an independent variable that represents the position in the double slit in the vertical direction.

$\rho$ is an independent variable that represents the position in the grating in the vertical direction.

x is an independent variable that represents the position on the sensor plane of the image sensor.

The complex refractive index of the sample 2 can be represented in the form of being included in the double-slit model $f(\xi)$. Specifically, the model $f(\xi)$ in the first state φ1 is independent of the sample 2. In contrast, the model $f(\xi)$ in the second state φ2 includes the complex refractive index of the sample 2.

The calculation processing device 200 acquires the model parameters and the complex refractive index of the sample 2 such that the intensity distribution of the interference image calculated based on the model in the first state φ1 approaches the first interference image 300 and the interference image calculated based on the model in the second state φ2 approaches the second interference image 302.

The above is the configuration of the optical constant measurement apparatus 100.

Experiments

Description will be made regarding the experiment results with respect to the optical constant measurement apparatus 100.

Figure 5:
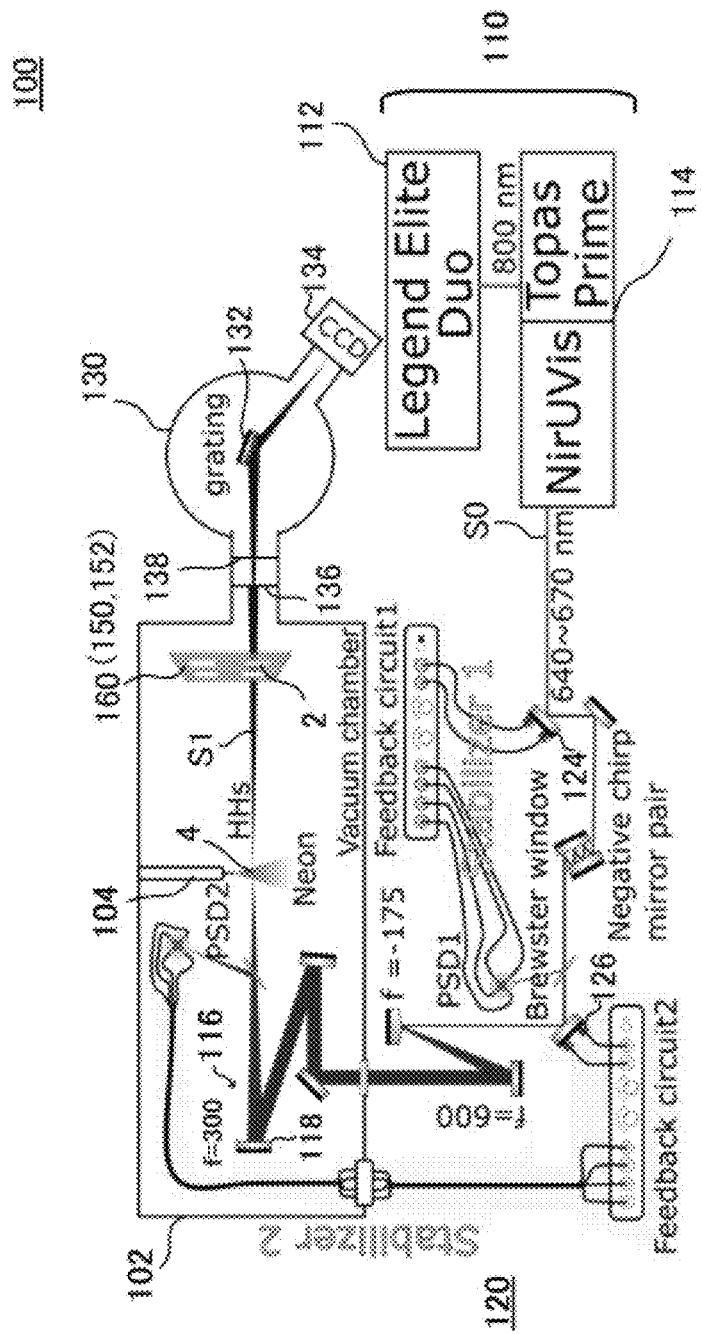
FIG. 5 is a diagram showing an optical constant measurement apparatus used in an experiment.

FIG. 5 is a diagram showing the optical constant measurement apparatus 100 used in the experiments.

Coherent Light Source 110

The coherent light source 110 is configured including a main light source 112 and an optical parametric amplifier 114. As the main light source 112, the Legend Elite Duo (5 kHz, 2.2 mJ), which is a regenerative-amplifier mode-locked Ti:sapphire laser manufactured by Coherent, Inc. was employed. As the optical parametric amplifier 114, TOPAS-Prime with NirUVis manufactured by LIGHT CONVERSION was employed. The second-order harmonic of signal light extracted from the optical parametric amplifier 114 was employed as short-pulse laser light S0 that is the fundamental wave in the high-order harmonics generation. As the short-pulse laser light S0, thirteen wavelengths ranging from 650 nm to 670 nm can be used. The short-pulse laser light S0 has a pulse width of 25 fs, which was measured by means of an FC spider manufactured by APE GmbH. With this arrangement, by optimizing the wavelength of the fundamental wave (short-pulse laser light S0) and optimizing the combination of the wavelength of the fundamental wave and the order of the high-order harmonics, this is capable of providing an interference image at a desired wavelength in the EUV region.

As the nonlinear medium 4 to be used for the harmonic generation, neon gas was employed. A focusing optical system 116 is configured between the coherent light source 110 and the nonlinear medium 4. The fundamental wave having a diameter of 25 mm is focused by means of the focusing optical system 116 on the neon gas injected from a gas nozzle 104 having a diameter of 200 μm and arranged in a vacuum chamber 102. The focusing optical system 116 mainly includes a mirror 118 with f=300 mm. The estimated focusing size of the fundamental wave is approximately 8 μm. The high-order harmonics generated in the neon gas propagate in the same axial direction as in the fundamental wave and reach the double slit 150 or 152. The high-order harmonics, which are irradiated to the double slit 150 or 152, have sufficiently high coherence. Accordingly, the wavefront that passes through the double slit 150 or 152 propagates in the same axial direction as in the pointing vector of the incident wavefront with interference in the Xo direction (vertical direction) shown in FIG. 2.

In the experiment, a toroidal grating was employed as the grating 132. The harmonics that pass through the incident slit 136 of the spectrometer 130 reach the toroidal grating, and are diffracted in the X-axis direction of the CCD camera shown in FIG. 2. The toroidal grating is arranged such that the interference image that occurs at the incident slit 136 of the spectrometer 130 is dispersed and focused on the CCD camera for each order by means of the toroidal grating. As the CCD camera, the Andor DO940P BN was employed. As the toroidal grating, the HORIBA Jobin Yvon 541 00 200 was employed. The wavelength was calibrated using the McPherson Model 629.

The sample holder 160 including the double slits 150 and 152 can be moved by means of the movable stage 170. This enables switching between the double slit (first double slit 150) in which both apertures are empty and the double slit (second double slit 152) in which the sample 2 is mounted in one aperture.

In the experiment, a single interference measurement was performed once for each of the double slit 150 in which both apertures were empty and the double slit 152 in which the sample 2 was mounted in one aperture for one fundamental wavelength. Each measurement was integrated for 200 seconds, which corresponds to the integration of $1 \times 10^6$ pulses. As described later, the drift that occurs in the optical path of the fundamental wave becomes a cause of a systematic error of the phase shift to be estimated. In order to solve such a problem, this arrangement suppresses the occurrence of drift in the optical path to a minimum by active control.

Sample 2

The sample is an aluminum thin film, which was purchased from Luxel. The sample has a film thickness of 156±5 nm. In a case in which there is an oxide film on the sample, the refractive index of the sample is measured as an effective refractive index. As a result of estimating the oxide film by means of an ellipsometer, it was found that there was an oxide film having a thickness of 10 nm on each face. Accordingly, the oxide film was removed from the front face and the back face of the sample by Ar sputtering. After the removal of the oxide film, in the experiment, the sample was handled in an oxygen-free environment (partial pressure of 100 Pa or less). After the experiment, the sum total of the thicknesses of the oxide films on the front and back faces of the sample was 6.5 nm. As described above, it can be assumed that the sample has an aluminum film thickness of 134.5±5 nm, and an oxide film thickness of 6.5 nm.

The focusing optical system 116, the gas nozzle 104, and the sample holder 160 are arranged in the vacuum chamber 102 coupled to the spectrometer 130. The internal spaces of the spectrometer 130 and the vacuum chamber 102 are maintained in a vacuum state by means of a pump.

Experiment Results

The CCD camera has 2048 pixels in the horizontal (Y) direction and 512 pixels in the vertical (X) direction for a total of 2048×512 pixels. The harmonic interference image focused on the two-dimensional CCD grating is converted into a one-dimensional interference image for each order by the following operation. Each order harmonic has a finite width (FWHM=9 pixels) in the $Y_2$ direction on the CCD plane due to the wavelength width and the apparatus function of the spectrometer. Accordingly, the signal intensity is integrated over 15 pixels with the position that corresponds to the peak intensity as the center, and the integrated value is used as the signal intensity for each order.

Figure 6A:
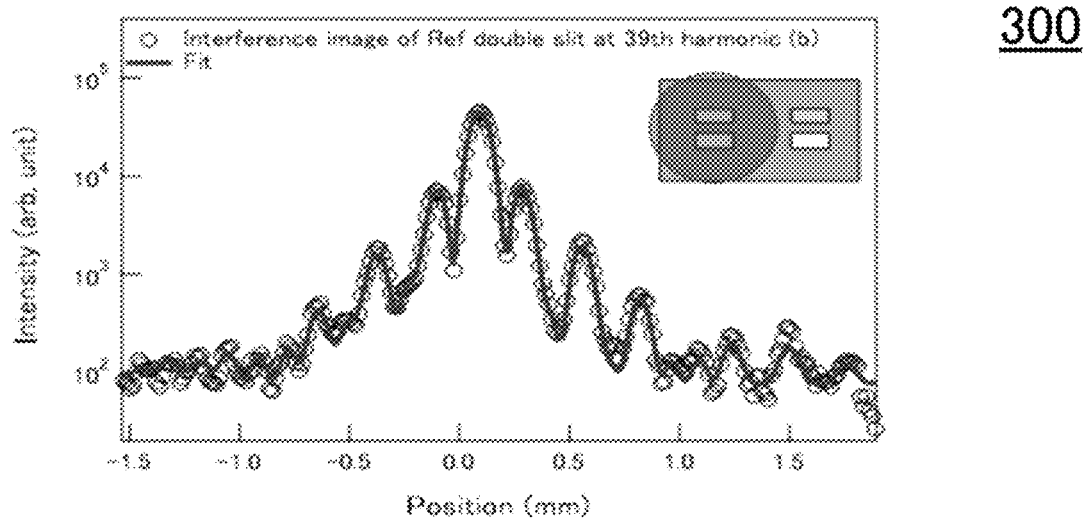
FIGS. 6A and 6B are diagrams each showing the signal intensity of an interference image of the 39-th harmonic of a fundamental wave at a wavelength of 650 nm.
Figure 6B:
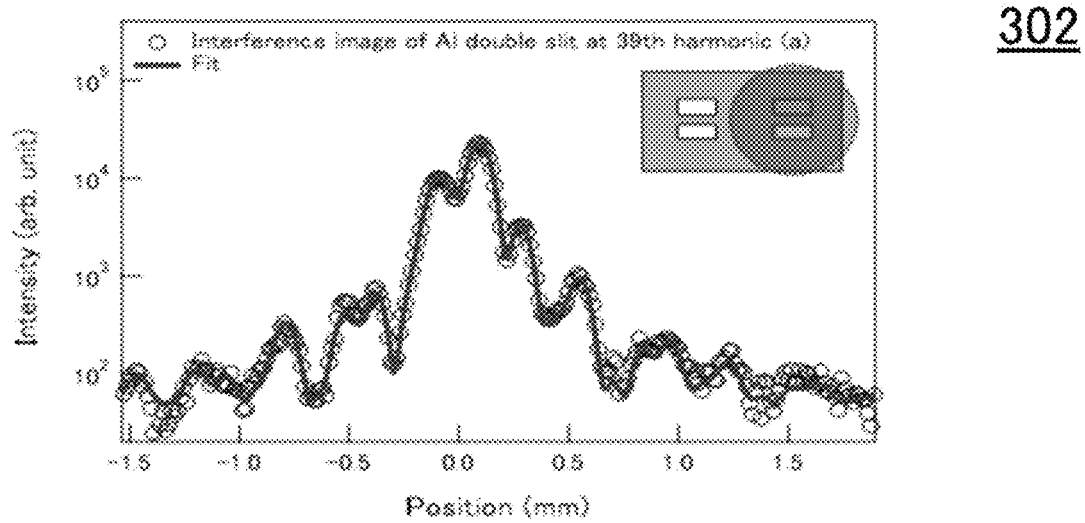

FIGS. 6A and 6B each show the signal intensity of the 39-th harmonic interference image obtained from the fundamental wave at the wavelength 650 nm. The horizontal axis represents the position on the Y axis of the two-dimensional CCD camera. FIG. 6A shows an interference image 300 of the first double slit 150 acquired in the first state $\phi 1$. FIG. 6B shows an interference image 302 of the second double slit 152 acquired in the second state $\phi 2$. There is a difference in the fringe position and the light intensity between the two indifference images, i.e., the interference image 300 shown in FIG. 6A and the interference image 302 shown in FIG. 6B. In FIGS. 6A and 6B, the open-circle plots indicate an interference image acquired by measurement. On the other hand, the solid-line plots indicate an interference image obtained by calculation.

Analysis

An investigation was made with regard to an analysis method for estimating the phase shift and the attenuation rate of the electric field due to the change in the optical path via which the light passes through the sample 2 based on the shape of the interference image. In the analysis of the fringe pattern of the interference image, in many cases, the Fourier transform method is used as a simple method for convenience (Non-patent document 31). In this analysis method, the phase is extracted for each point with respect to the frequency component to be analyzed. However, the phase terms depend on the geometric structure and the layout of the slit apertures in addition to the optical path difference that occurs due to the light passing through the sample. Accordingly, in order to estimate the optical path difference, there is a need to clarify the contribution to the phase made by each component. However, in a case in which an optical system such as a lens or the like is inserted between the apertures and the screen, or in a case in which the wavefront emitted from the light source cannot be regarded as a plane wave, in a case of using only the Fourier transform method, it is difficult to clarify the analysis results in detail. Furthermore, in a case in which a parameter other than the phase is to be obtained, the Fourier transform method cannot be employed as a suitable method.

In order to clarify the contribution to the optical path difference, one-dimensional Fresnel diffraction was employed to evaluate how the geometric size and position of the apertures, lens aberration, and the incident wave affect the interference image. The shape of the interference image obtained using one-dimensional Fresnel diffraction, which is a paraxial approximation, is represented by the following Expression (2).

[Expression 2]

$$I(x_2) = A \left| \int \int g(x_0) f(x_0) e^{i\pi \frac{(x_0-x_1)^2}{z_{01}\lambda}} e^{iW(x_1)} e^{i\pi \frac{(x_1-x_2)^2}{z_{12}\lambda}} dx_0 dx_1 \right|^2 \quad (2)$$

$x_0$: Independent variable that represents the position in the x direction on the double-slit plane.

$x_1$: Independent variable that represents the position in the x direction on the grating plane.

$x_2$: Independent variable that represents the position in the x direction in the CCD array.

$\lambda$: Wavelength.

$I(x_2)$: CCD A/D signal intensity at each $x_2$ position in the CCD array.

$g(x_0)$: Wavefront of the harmonic (incident wave) on the double-slit plane.

$f(x_0)$: Aperture function of the double slit.

$W(x_1)$: Phase applied by the toroidal grating.

$Z_{01}$ represents the distance between the double-slit plane and the grating plane, which is 0.72 m. $Z_{12}$ represents the distance between the grating plane and the image capture plane (screen plane) of the CCD array, which is 0.3 m. $Z_{01}$ and $Z_{12}$ are each handled as a constant value.

A region that corresponds to a slit aperture provides a transmittance of 100%. In contrast, a region that does not correspond to a slit aperture provides a transmittance of 0%. Accordingly, the aperture function $f(x_0)$ is ideally represented by a step function having 0 and 1 with points of discontinuity at the aperture boundary.

In the experiment, a double slit having an aperture width of 20 μm was employed. Focused ion beam (FIB) manufacturing involves manufacturing error. Accordingly, the slit width and the slit interval are not handled as constants. Instead, the slit width and the slit interval are each handled as a variable. Specifically, the slit width and the slit interval are calculated and employed such that the calculation values of the interference image obtained based on Expression (2) best match the measurement values (300, 302) acquired by measurement. Furthermore, in order to remove high-frequency components that are equal to or higher than the Nyquist frequency, the aperture function $f(x_0)$ was replaced by an error function having a width of 1 μm.

It can be considered that the harmonic light source provides a beam size of 10 μm or less. Accordingly, the electric field intensity is uniformly distributed in the apertures of the double slit 150 or 152 arranged at a distance of 44 cm from the light source. The spatial coherence of the harmonics in the apertures of the double slit can be assumed to be 100% based on the van Cittert-Zernike theorem (Non-patent document 32).

Next, in order to verify the effects of the broadening of the spectrum width on the interference image, the line width was measured. As a result of the measurement, it has been found that the width was sufficiently narrow to have a negligible effect. That is to say, degradation of the visibility due to the line width is negligible.

The pointing of the fundamental wave focused on the neon gas as the nonlinear medium 4 for the harmonics and the phase of the interference image were simultaneously monitored. As a result, it has been confirmed that there is a clear correlation between them, i.e., a relation of 0.8 mrad/ μm. The focusing position drifts at a maximum speed of 4 μm/min. In this case, one measurement over 200 seconds involves the occurrence of an error on the order of 10 mrad. In order to eliminate the uncertainty due to this drift, the drift is suppressed using the following method.

In order to stabilize the beam pointing, a stabilizing apparatus 120 is provided. The stabilizing apparatus 120 monitors the positions of the short-pulse laser light at two points, i.e., at a position in the focusing optical system 116 at which the short-pulse laser light is provided as parallel light and at the focusing point, so as to control the mechanical state of the optical elements of the focusing optical system 116. Specifically, the position of the fundamental wave S0 is monitored at two points, i.e., a point at which the fundamental wave S0 is provided as parallel light and at the focusing point, using position detector elements PSD1 and PSD2. With this, two mirror holders 124 and 126 that form the focusing optical system 116 together with the mirror 118 are controlled by means of a piezo actuator, thereby providing stabilization using the two position detection elements. The focusing position was stabilized to 0.1 μm or less on average over $1 \times 10^6$ pulses. With such an arrangement providing such stabilization, this allows systematic error due to the drift of the focusing position of the fundamental wave to be suppressed to 0.08 mrad or less.

However, this stabilizing method cannot provide control of fluctuation that occurs between adjacent pulses that reach a pitch of 200 μs. In order to solve such a problem, it has been assumed that the ($1 \times 10^6$) focusing positions, i.e., the centers of the wavefronts g, are distributed according to a standard distribution with a standard deviation P. The standard distribution was approximated by the following series approximation. It should be noted that the number of series terms was set to 9 (M=4) in order to reduce the calculation cost to the minimum. With this, Expression (2) can be modified as represented by the following Expression (3).

[Expression 3]

$$I(x_2) = A \sum_{m=-M}^{M} \exp\left(-\frac{2m^2}{M^2}\right) \left| \int\int g(x_0 + 2mP_\sigma/M) f(x_0) e^{i\pi \frac{(x_0-x_1)^2}{z_{01}\lambda}} e^{iW(x_1)} e^{i\pi \frac{(x_1-x_2)^2}{z_{12}\lambda}} dx_0 dx_1 \right|^2 \quad (3)$$

In order to provide a chi-square test for Expression (3), the statistical uncertainty that occurs in the CCD A/D signal was clarified. HHG light (72.8 eV) was measured by a CCD camera at a sampling rate that is sufficiently shorter than the time constant of disturbance. The variance of the CCD A/D signal has a linear component with a slope of approximately 2 with respect to the average signal intensity. That is to say, this variance is so-called photon shot noise, the standard deviation of which is represented by the following Expression (4) with the A/D signal intensity as I.

[Expression 4]

$$\sigma_{shot} = \sqrt{2I} \quad (4)$$

Noise Originating Due to Dark Current

The noise due to the dark current of the CCD camera is on the order of 0.0000175 A/D counts/pixel/sec. It can be assumed that the noise due to the dark current becomes sufficiently smaller than the photon shot noise after integration over 200 seconds. Accordingly, in this experiment, the noise due to the dark current is ignored.

Read Noise

Each pixel of the CCD camera involves read noise. Read noise of 1.21 A/D counts/pixel occurs per pixel at a read rate of 50 kHz. As described above, analysis was made giving consideration to the signal integration in which the signal is integrated for each point over 15 pixels with the position that corresponds to the peak intensity as the center as described above, and the processing in which the signal is acquired by subtracting the background from the original signal.

The statistical error of the A/D signal intensity I for each X point is represented by the following Expression (5) giving consideration to the factors described above.

[Expression 5]

$$\sigma_{stat} = \sqrt{2I + 1.21^2 \times 30} \quad (5)$$

First, analysis is made assuming that the incident wavefront g is the simplest plane wave, and the phase applied by the toroidal plane is represented by the following Expression (6).

[Expression 6]

$$W(x_1) = -\pi x_1^2 / f\lambda \tag{6}$$

Here, "f" represents the focal distance of the toroidal plane along the optical axis of the zero-order diffracted light, which is 0.3 m. As a result of a chi-square test, it can be found that $\chi_r^2$ normalized by the degrees of freedom measured at different wavelengths is distributed in a range between 10 and 60. This means that there is a discrepancy that is significantly larger than the statistical error between the model function and the measurement values.

In order to solve such a discrepancy, the incident wavefront g and the phase term W originating due to the toroidal grating were re-investigated. Reports are known in which the wavefronts of harmonics generated by a Gaussian beam can be represented with high precision by a Gaussian beam (TEM00 mode) (Non-patent documents 33 and 34). From among the terms that represent the wavefront of the TEM00 mode, the component that changes with respect to a change $x_0$ on a plane that is orthogonal to the propagating direction is represented in the form of a quadratic function.

That is to say, the wavefront is not a plane wave. Rather, the wavefront exhibits dependence on the change x0 on the plane as represented by the following Expression (7).

[Expression 7]

$$g(x_0) = \exp\left(-i\pi \frac{x_0^2}{R\lambda}\right) \tag{7}$$

It is known that the waist position of a harmonic has order dependence. Accordingly, "R" is handled as an order-dependent variable (Non-patent document 33).

The change of phase W is represented by the following Expression (8) assuming that the change of phase W is applied to each $x_1$ point by the trochoidal grating.

[Expression 8]

$$W_\lambda(x_1) = \frac{2\pi\xi(\lambda)x_1}{z_{12}\lambda} - \frac{\pi x_1^2}{F(\lambda)\lambda} \tag{8}$$

The first term represents the slope of the wavefront due to the toroidal grating. The second term represents the curvature due to the toroidal grating. Here, $\xi$ (in the slope term) and F (in the curvature term) are each handled as a variable dependent on the wavelength $\lambda$. The detailed design of the grating has been black-boxed. Accordingly, higher-order phase terms than the above-described terms will not be described in the present disclosure.

The variables described above are optimized so as to reproduce well the interference image 300 measured in the first state ϕ1, and calculates the shape of the interference image of both empty double slits using the least-square method. The calculation results are indicated by the solid line in FIG. 6A. It can be understood that there is agreement by more than two orders in the dynamic range between the calculation result and the measurement result. As the fitting parameters, (A, $\xi$, F, R) and the fluctuation $P_o$ of the light source are employed. With the improved method described above, $\chi_r^2$ becomes a distribution from 1.6 to 6.4.

Next, the interference image 302 measured in the second state ϕ2 in which the sample 2 is in one slit of the double slit is evaluated using Expression (2). The aperture function of the slit with the sample 2 installed is modified by multiplying the L·exp(iθ) term using the electric field transmittance L and the phase difference θ. Also in this case, it has been found that there is agreement of two or more orders in the dynamic range. It should be noted that, as the aberration and the incident wavefront, the values obtained by the measurement and analysis of the first state ϕ1 were used. As the fitting parameters, (A, L, θ) and the fluctuation $P_o$ of the light source are employed.

Systematic Error

The improved fitting model reduces χr2 to on the order of 1.6 to 6.4. However, as a result of investigating the distribution of residuals, it has been found that systematic characteristics exist. Such non-random systematic residuals contribute to the uncertainties of the parameters as systematic error. In order to solve such a problem, the root mean square of the systematic residuals=$O_{rms}$ is handled as the systematic error between the measurement value and the model (Non-patent document 35). Furthermore, the distribution of the systematic residuals is approximated as a normal distribution with a standard deviation of $O_{rms}$ (Non-patent document 36). The uncertainty of the phase θ estimated based on the systematic error is represented by $\Delta\theta_{syst}=8$ mrad. It should be noted that, in the present disclosure, in all cases, the uncertainty thus obtained corresponds to a 68% confidence interval. The statistical uncertainty $\Delta\theta_{stat}$ also corresponds to a 68% confidence interval. As the total uncertainty, the square root of the sum of squares of $\Delta\theta_{syst}$ and $\Delta\theta_{stat}$ is employed.

Figure 7:
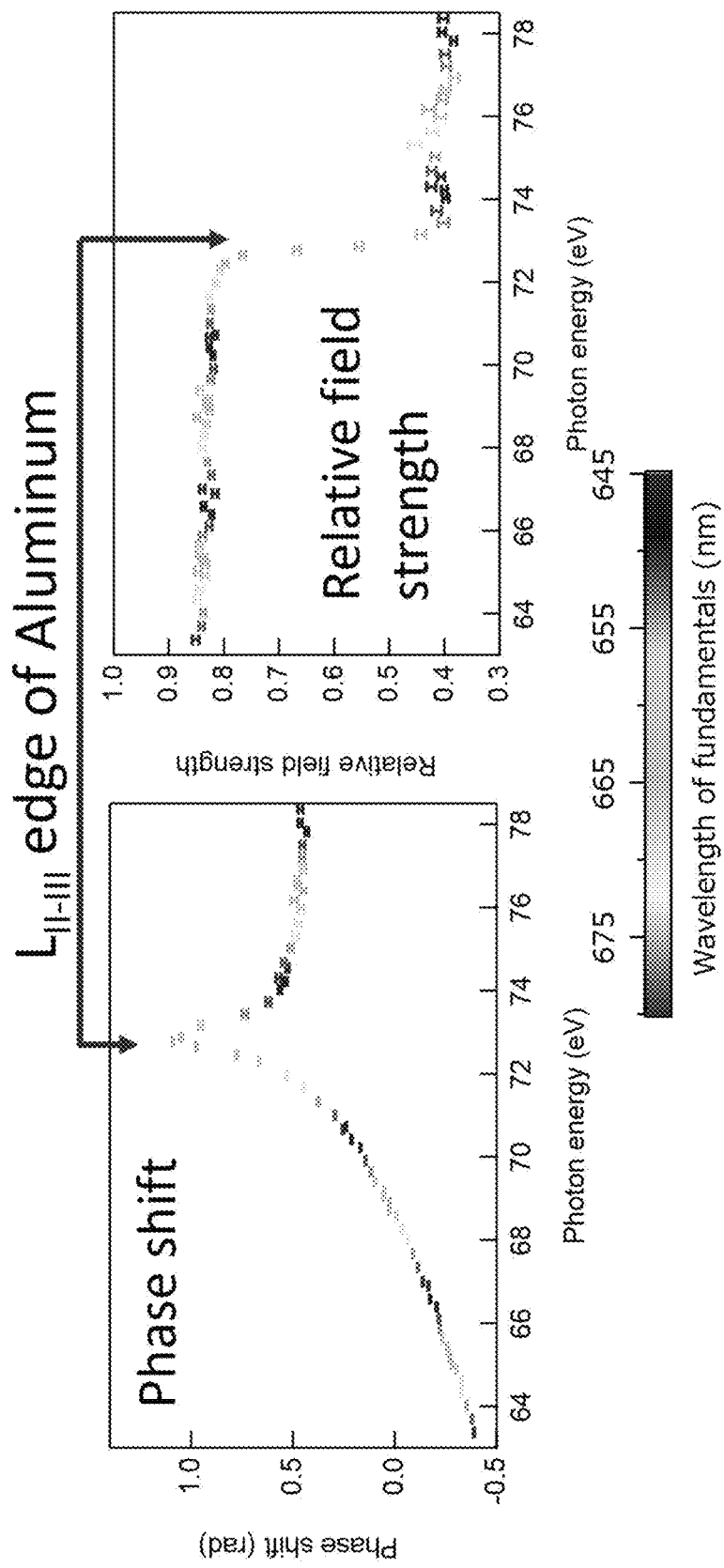
FIG. 7 is a diagram showing θ and L acquired in the experiment.

FIG. 7 is a diagram showing θ and L measured in the experiment. A clear spectrum structure having a peak at 72.8 eV is observed. This indicates the L-edge of aluminum. The refractive index can be calculated using the following Expression (9).

[Expression 9]

$$\sigma = \theta\lambda/2\pi d, \beta = -\ln(L)\lambda/2\pi d \tag{9}$$

The oxide film has a very different refractive index. This leads to large uncertainty in the refractive index. The phase shift effect of the oxide films having a total thickness of 6.5 nm on the front face and the back face was estimated based on the following Expression (10) using reference values.

[Expression 10]

$$\sigma_{Al} = (\theta\lambda/2\pi - \sigma_{Al_2O_3}d_{Al_2O_3})/(d - d_{Al_2O_3})$$

$$\beta_{Al} = (-\ln(L)\lambda/2\pi - \beta_{Al_2O_3}d_{Al_2O_3})/(d - d_{Al_2O_3}) \tag{10}$$

Assuming that the refractive index of the oxide film is represented by the following Expression (11), $d_{AL2O3}=6.5$ nm and d=141 nm±5 nm were obtained.

[Expression 11]

$$N = 1 - \sigma_{Al_2O_3} + i\beta_{Al_2O_3} \tag{11}$$

Figure 8:
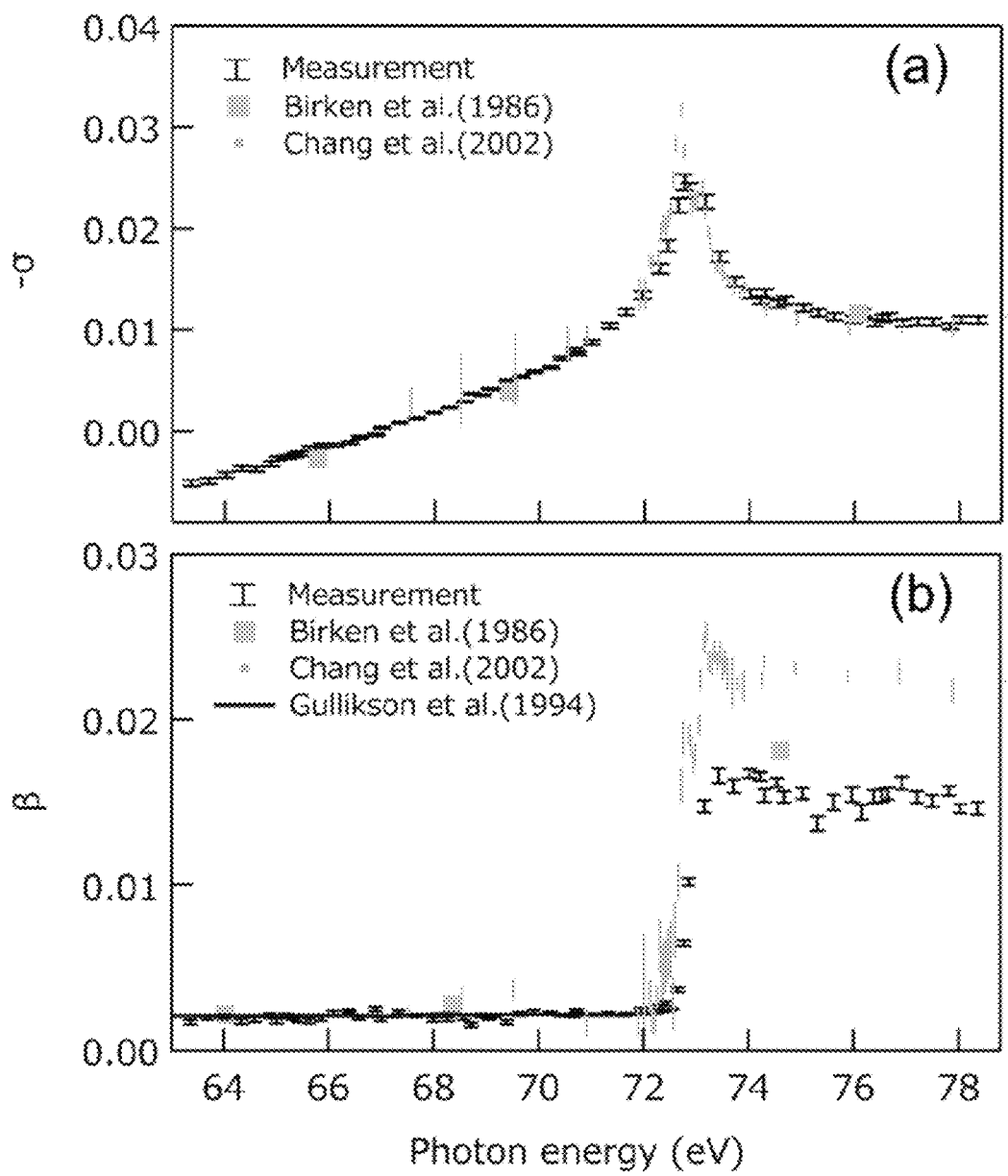
FIG. 8 is a diagram showing the refractive index acquired in the experiment.

FIG. 8 is a diagram showing the refractive index obtained from the experiment. The uncertainty of the film thickness contributes to each error bar in addition to the uncertainties of θ and L. FIG. 8 shows the plots of refractive indexes reported in the past in addition to the plot of the error bars obtained by the optical constant measurement apparatus 100. Both the real part and the imaginary part of the refractive index agree with those reported by Birken (Non-patent document 7) at an energy around the L-edge. However, these values do not agree with the database of CXRO (The Center for X-ray Optics) and the results reported by Chang (Non-patent document 8). Furthermore, in the energy range that is equal to or lower than the L-edge, the experiment values of the imaginary part of the refractive index agree with the results reported by Gullikson (Non-patent document 9) with a margin of an error bar. The reason why the experiment values do not agree with the results reported by Chang is due to uncertainty in the dispersion measurement.

Figure 9:
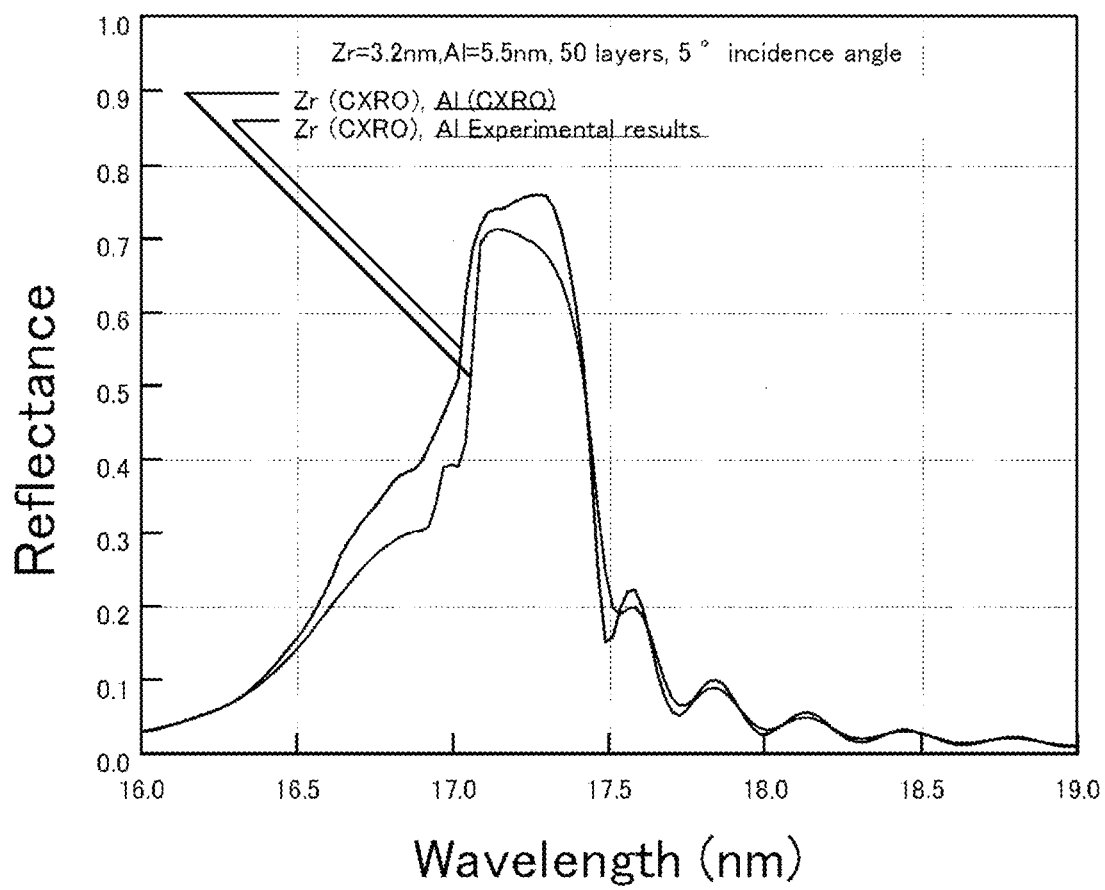
FIG. 9 is a diagram showing calculation results of the reflective index of an Al/Zr multilayer mirror.

FIG. 9 is a diagram showing the calculation results of the reflective index of an Al/Zr multilayer mirror. As the optical constants of Zr, the CXRO values are used. As the optical constants of Al, the optical constants measured by the optical constant measurement apparatus 100 and the CXRO values are used. It has been confirmed that, in a case of designing the multilayer mirror based on the optical constants thus measured in the experiment, this provides a significant difference on the order of 5±1%.

The above is the description of the optical constant measurement apparatus 100 according to the embodiment.

In summary, the complex refractive index was quantitatively estimated as a parameter of the model function by modeling the double-slit interference image of the high-order harmonics. The statistical uncertainty of the measurement value was quantified by measurement. The design of the double slit was optimized so as to reduce the uncertainty of the complex refractive index to the minimum.

The systematic error factors were investigated. Furthermore, the effects of the systematic error on the complex refractive index were evaluated. The experimental system was built so as to minimize the drift of the beam pointing, which is a main cause of systematic error.

The measurement results of the refractive index of aluminum in a range of 63 to 78 eV agree with those reported by Birken for both the real part and the imaginary part of the refractive index in the vicinity of the L-edge. However, the measurement results do not agree with CXRO and the results reported by Chang. Furthermore, the measurement results of the imaginary part of the refractive index in an energy range that is equal to or lower than the L-edge agree with the results reported by Gullikson.

As the estimation of the refractive index in the EUV region, the measurement error was quantitatively estimated for the first time. Based on the shape analysis of the interference image, the detection error of the phase shift was estimated to be on the order of 9 mrad in an energy range that is equal to or lower than the L-edge, and to be on the order of 13 mrad in an energy range that is higher than the L-edge. The accuracy was improved by two orders of magnitude for a double-slit interferometer based on high-order harmonics.

With such an arrangement that provides improvement by two orders in the determination of the complex refractive index dispersion, this allows the reflective index of a multilayer mirror to be estimated within a precision range of ±1%.

With such a tabletop optical constant measurement apparatus having accuracy that satisfies the requirements for optical element design in the EUV region, this allows various kinds of optical materials to be explored in a simple manner.

It can be anticipated that these results can be applied to searches for materials such as searches for mask elements or the like from among the optical elements for EUV lithography that require control of the phase of light as an important factor, searches for materials of a multilayer reflecting mirror for EUV imaging in the astronomical observation field, etc.

Description has been made above regarding the present invention with reference to the embodiments. The above-described embodiments have been described for exemplary purposes only, and are by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

Description has been made above regarding an arrangement that provides two-stage processing in which, after several parameters (A, ξ, F, R, $P_o$) are determined based on a fitting method using the first interference image 300, (A, L, θ, $P_o$) are calculated based on a fitting method using the second interference image 302. However, the calculation procedure is not restricted to such an arrangement. Also, all the parameters (A, ξ, R, $P_o$, L, θ) to be used for the description of the model may be optimized at the same time such that the interference images calculated based on Expression (2) accurately fit to both the two interference images 300 and 302 measured by measurement.

In a case of reusing the sample holder 160, in the second and subsequent measurements, the measurement of the first interference image 300 may be omitted, i.e., only the second interference image 302 may be measured so as to calculate the optical constants of the sample.

The method for determining the model (function) of the optical constant measurement apparatus 100 is not restricted to such an arrangement described in the embodiment. Also, any arrangement may be made so long as the actual measurement apparatus is represented with the highest accuracy by the functions g(ξ), f(ξ), and W(ρ) that represent the wavefront, the apertures of the double slit, and the grating.

What is claimed is:

1. An optical constant measurement apparatus comprising:
    a coherent light source structured to output coherent light including high-order harmonics obtained by irradiating short-pulse laser light to a nonlinear medium;
    a spectrometer comprising a grating structured to diffract the coherent light and an image sensor structured to measure an image of light diffracted by the grating;
    a first double slit having a pair of apertures arranged with an interval in a first direction, which are arranged at a predetermined position between the coherent light source and an incident slit of the spectrometer in a first state;
    a second double slit having a pair of apertures that are a replica of the first double slit, which are arranged at the predetermined position as a replacement of the first double slit in a state in which one from among the pair of apertures holds a sample in a second state; and
    a calculation processing device structured to calculate optical constants of the sample based on a first interference image formed on the image sensor due to the harmonics of the coherent light in the first state and a second interference image formed on the image sensor due to the harmonics in the second state, wherein the optical constant measurement apparatus in the first state and the optical constant measurement apparatus in the second state are respectively modeled using parameters, wherein the calculation processing device calculates a first intensity distribution formed on the image sensor in the first state based on a first model representing the optical constant measurement apparatus in the first state using a one-dimensional Fresnel diffraction expression, the calculation processing device calculates a second intensity distribution formed on the image sensor in the second state based on a second model representing the optical constant measurement apparatus in the second state using the one-dimensional Fresnel diffraction expression, and wherein the calculation processing device calculates the parameters of the first model and the second model and the optical constants of the sample such that the first intensity distribution matches the first interference image and the second intensity distribution matches the second interference image.

2. The optical constant measurement apparatus according to claim 1, wherein the first double slit and the second double slit are continuously formed in a second direction that is orthogonal to the first direction, and wherein the optical constant measurement apparatus comprises a stage structured to shift the first double slit and the second double slit in the second direction.

3. The optical constant measurement apparatus according to claim 1, wherein the coherent light source comprises an optical parametric amplifier, and wherein the coherent light source is structured to provide the short-pulse laser light with a variable wavelength.

4. The optical constant measurement apparatus according to claim 1, wherein the coherent light source comprises:
a main light source structured to generate the short-pulse laser light;
a gas nozzle structured to inject a gas that is the nonlinear medium;
a focusing optical system structured to focus the short-pulse laser light onto the gas; and
a stabilizing apparatus structured to monitor position of the short-pulse laser light at two points in the focusing optical system, wherein the short-pulse laser light is provided as parallel light in one of the two points, and another of the two points is a focusing point of the focusing optical system.

5. A method for calculating an optical constant of a sample based on a first interference image and a second interference image obtained by a measurement system, wherein the measurement system comprises:
a coherent light source structured to output coherent light including high-order harmonics obtained by irradiating short-pulse laser light to a nonlinear medium;
a spectrometer comprising a grating structured to diffract the coherent light and an image sensor structured to measure an image of light diffracted by the grating;
a first double slit having a pair of apertures arranged with an interval in a first direction, which are arranged at a predetermined position between the coherent light source and an incident slit of the spectrometer in a first state; and
a second double slit having a pair of apertures that are a replica of the first double slit, which are arranged at the predetermined position as a replacement of the first double slit in a state in which one from among the pair of apertures holds a sample in a second state, wherein, in the first state, the first interference image is formed on the image sensor as an image of harmonics of the coherent light, wherein, in the second state, the second interference image is formed on the image sensor as an image of the harmonics of the coherent light, and wherein the calculation method comprises:
defining a first model representing of the measurement system in the first state with at least the grating and the first double slit as parameters;
defining a second model representing the measurement system in the second state with at least the grating and the second double slit as parameters;
calculating a first diffraction pattern generated by the first model based on a one-dimensional Fresnel diffraction expression;
calculating a second diffraction pattern generated by the second model based on a one-dimensional Fresnel diffraction expression; and
calculating parameters of the first model and the second model and the optical constant of the sample such that the first diffraction pattern approaches the first interference image, and the second diffraction pattern approaches the second interference image.

6. The optical constant measurement apparatus according to claim 1, wherein
$g(x_0)$: wavefront of the high-order harmonics on the double-slit surface;
$f(x_0)$: aperture function of the double slit; and
$W(x_1)$: phase applied by the grating
are respectively implemented in the first and the second models using the parameters,
where $x_0$ is an independent variable that represents the position in the x direction on a double-slit surface on which the first double slit or the second double slit is provided,
$x_1$ is an independent variable that represents the position in the x direction on a surface of the grating.

7. The optical constant measurement apparatus according to claim 6, wherein the calculation processing device calculates the first intensity distribution and the second intensity distribution based on $$I(x_2) = A \left| \int\int g(x_0) f(x_0) e^{i\pi \frac{(x_0-x_1)^2}{z_{01}\lambda}} e^{iW(x_1)} e^{i\pi \frac{(x_1-x_2)^2}{z_{12}\lambda}} dx_0 dx_1 \right|^2 \quad (2)$$

where
$x_2$ is an independent variable that represents the position in the x direction on the image sensor,
$Z_{01}$ is a distance between the double-slit surface and the surface of the grating,
$Z_{12}$ is a distance between the surface of the grating and a plane of the image sensor, and
$\lambda$ is a wavelength.

8. The optical constant measurement apparatus according to claim 6, wherein the aperture function $f(x_0)$ of the first double slit and the second double slit are modeled using an error function.

9. The optical constant measurement apparatus according to claim 6, wherein the aperture function $f(x_0)$ of the first double slit and the second double slit include $\exp(i\theta)$ where $\theta$ is a phase difference.

10. The optical constant measurement apparatus according to claim 6, wherein the first interference image and the second interference image are each measured as an integrated interference image using multiple irradiations of the coherent light, and wherein the function $g(x_0)$ of the wavefront of an incident wave to each of the first double slit and the second double slit is modeled assuming that a center position thereof fluctuates in a normal distribution.

11. The optical constant measurement apparatus according to claim 6, wherein the grating is a toroidal grating, and the phase $W(x_1)$ applied by the grating is given by $$W_\lambda(x_1) = \frac{2\pi\xi(\lambda)x_1}{z_{12}\lambda} - \frac{\pi x_1^2}{F(\lambda)\lambda} \qquad (8)$$

where $\xi$ represents a slope and F represents a curvature.

* * * * *